United States Patent [19]

Hebb

[11] 4,346,598

[45] Aug. 31, 1982

[54] CAM ACTUATED FUEL MODULATING ENGINE GOVERNOR

[75] Inventor: Edwin E. Hebb, Dearborn, Mich.

[73] Assignee: General Motors Corporation, Detroit, Mich.

[21] Appl. No.: 161,033

[22] Filed: Jun. 19, 1980

Related U.S. Application Data

[62] Division of Ser. No. 970,456, Dec. 18, 1978, Pat. No. 4,235,212.

[51] Int. Cl.³ ............................................ G05D 13/14
[52] U.S. Cl. ............................................ 73/536; 73/550
[58] Field of Search .............. 73/534, 535, 536, 550, 73/551, 530

[56] References Cited

U.S. PATENT DOCUMENTS

| | | | |
|---|---|---|---|
| 394,300 | 12/1888 | Rollason | 73/536 |
| 925,992 | 6/1909 | Bullard | 73/551 |
| 1,045,111 | 11/1912 | Abell | 73/532 |
| 1,228,402 | 6/1917 | Buckwalter | 73/551 |
| 3,713,344 | 1/1973 | Johnson et al. | 73/551 |
| 3,868,855 | 3/1975 | Murphy et al. | 73/536 |

FOREIGN PATENT DOCUMENTS 6456  7/1979  Fed. Rep. of Germany ........ 73/535

Primary Examiner—James J. Gill
Attorney, Agent, or Firm—Robert J. Outland

[57] ABSTRACT

A diesel engine mechanical governor is disclosed having various novel features including a fuel modulating and maximum and minimum speed controlling cam plate and follower mechanism which connects the governor speed responsive actuating mechanism with the fuel rack actuating means to modify the effect of the manual fuel control means in a predetermined manner. The disclosure also includes novel rocking flyweight mechanism arranged to provide an output force as a function of rotational input shaft speed in which the exponential increase in centrifugal force upon outward rocking of the flyweights is partially offset to provide a more gradual increase in force with a corresponding increase of speed.

4 Claims, 7 Drawing Figures

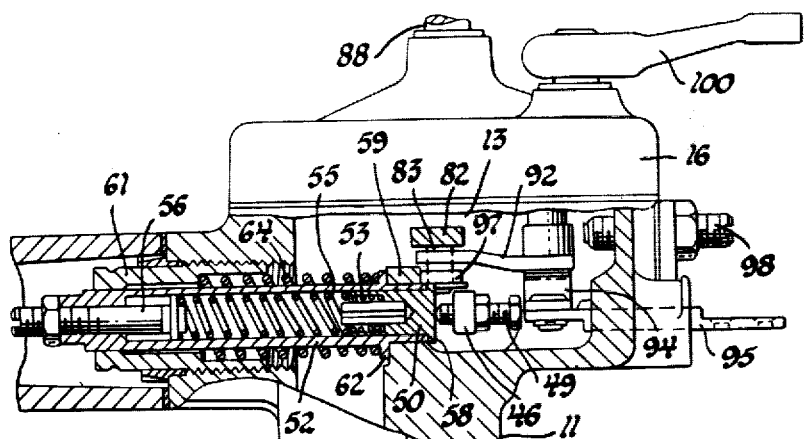
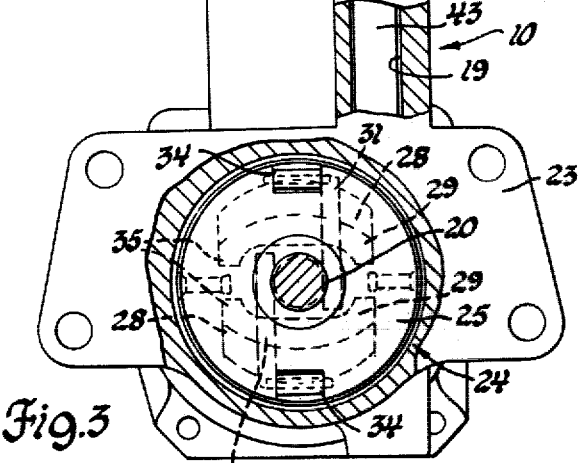
Fig.3
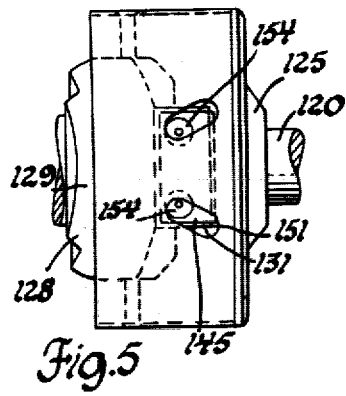
Fig.5
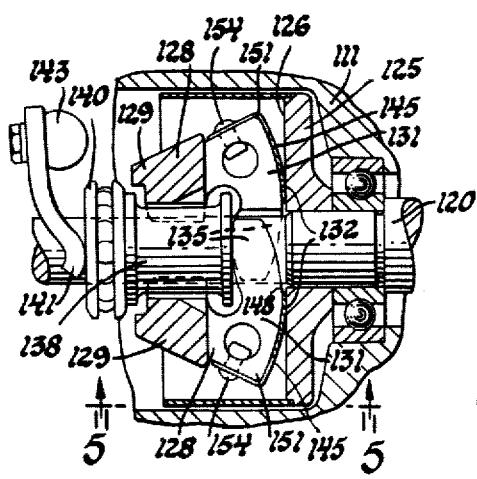
Fig.4
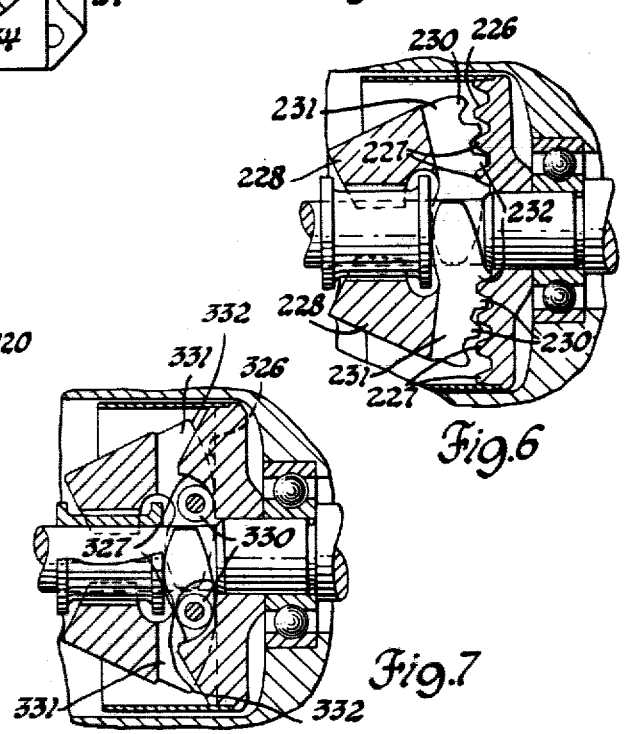
Fig.6
Fig.7

CAM ACTUATED FUEL MODULATING ENGINE GOVERNOR

This is a Division of application Ser. No. 970,456, filed Dec. 18, 1978 and now U.S. Pat. No. 4,235,212.

TECHNICAL FIELD

This invention relates to mechanical engine governors for internal combustion engines and, more particularly, to improvements in idle speed-limiting speed governors to provide intermediate speed fuel modulation and novel actuating mechanism including a pivoting cam plate and rocking flyweights.

BACKGROUND OF THE INVENTION

It is known in the art to provide a mechanical governor for internal combustion engines having means for controlling engine idle speed as well as for preventing engine operation above a preset maximum speed or range of speeds. One type of governor used for such purposes has centrifugal flyweights which act through a linkage against an idle speed spring and, upon its full compression, on a high speed spring which controls maximum engine speed. Between the preset idle and maximum speeds, the fuel input is controlled manually by the operator of the engine or vehicle, with the speed controlling functions of the governor coming into play only to prevent the engine from operating below its idle speed or above its preset maximum speed.

In certain engine applications, particularly vehicle applications in which governors of the above mentioned and other types have been used, devices have been provided either within or external to the governors to modulate the maximum engine fuel input at speeds intermediate the idle and maximum speeds. One purpose of such arrangements is to prevent overfueling of the engine cylinders at low engine speeds in order to control emissions of smoke, oxides of nitrogen or other undesirable exhaust products. While some such arrangements have been useful, it is believed that none have accomplished their desired purposes in the manner of the present invention.

SUMMARY OF THE INVENTION

The present invention provides a fuel modulating idle-maximum speed governor having internal mechanism similar to that of certain prior art governors but including novel features arranged to provide modulation of the engine fuel rack position at speeds intermediate the controlled idle and maximum speeds. The fuel modulating mechanism is integrated within the speed controlling portions of the governor so that the modulating control is accomplished by proper positioning of the fuel rack actuating levers without the use of variable stop cams and the like that interfere with the movement of such levers.

The modulating mechanism of the present governor includes a pivotally mounted cam plate acting upon a cam follower to control the position of the pivot of a differential lever provided to actuate the engine fuel rack levers. The pivotal position of the cam plate is determined as a function of engine speed by operation of a spring and flyweight mechanism that includes novel rocking flyweights having variable lever action permitting their use to control the complete range of engine speeds.

These and other features of the invention will be more fully understood from the following description of certain preferred embodiments taken together with the accompanying drawings.

BRIEF DESCRIPTION OF THE DRAWINGS

In the drawings:

FIG. 3 is a drive gear side view of the governor having portions broken away to show internal mechanism including the plunger and spring assembly as viewed from the plane generally indicated by the line 3—3 of FIG. 2;

FIG. 4 is a fragmentary cross-sectional view of an alternative embodiment of flyweight mechanism as used in a governor formed according to the invention;

FIG. 5 is a side view of the flyweight mechanism of FIG. 4 as viewed from the plane indicated by the line 5—5 of FIG. 4;

FIG. 6 is a fragmentary cross-sectional view showing another embodiment of flyweight mechanism used in a governor according to the invention, and FIG. 7 is a fragmentary cross-sectional view of still another embodiment of flyweight mechanism used in a governor according to the invention.

BEST MODE FOR CARRYING OUT THE INVENTION

Figure 1:
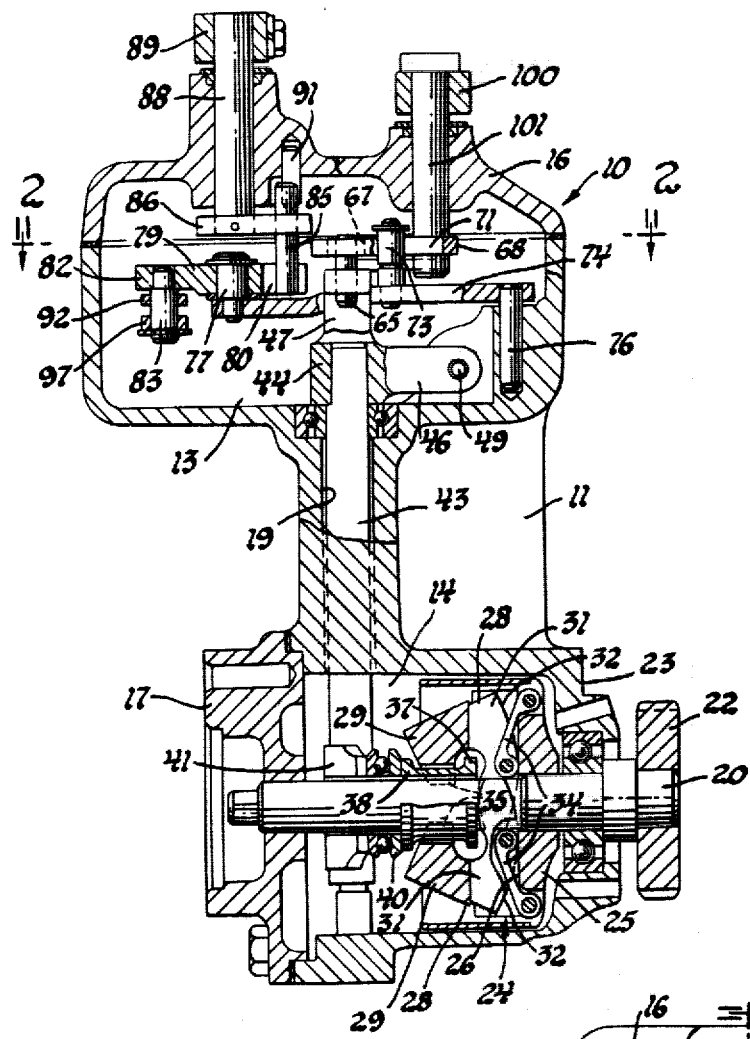
FIG. 1 is a cross-sectional view of a mechanical engine governor formed according to the invention illustrating the interconnection of certain internal components and taken in various planes as indicated in part by the line 1—1 of FIG. 2.
Figure 2:
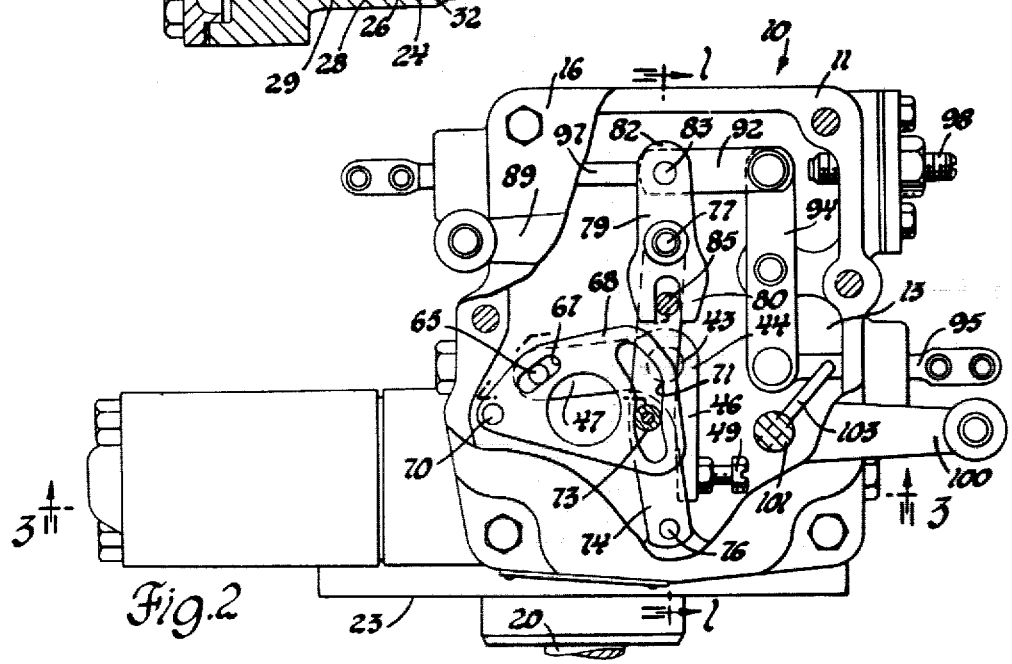
FIG. 2 is a top plan view of the governor of FIG. 1 having portions of the cover assembly removed to illustrate parts of the internal mechanism as viewed from the plane generally indicated by the line 2—2 of FIG. 1.

Referring now to the drawings in detail, FIGS. 1-3 illustrate the presently preferred embodiment of governor formed according to the invention which is generally indicated by numeral 10. Governor 10 includes a housing 11 including upper and lower mechanism compartments 13, 14, respectively, closed by removable covers 16, 17 and connected by a shaft duct 19.

In the lower portion of the housing, which defines compartment 14, there is journaled a rotatable input shaft 20 carrying an input drive gear 22. The gear is carried on a portion of the shaft 20 that extends outwardly of the compartment 14 beyond the housing mounting flange 23 in position to engage a mating gear (not shown) of the drive train of an associated engine, for driving the governor input shaft at a speed proportional to the engine operating speed.

Within compartment 14, the shaft 20 carries a flyweight mechanism 24. The flyweight mechanism includes a support member 25 rotatable with the input shaft about its axis and having a radial support surface 26 extending outwardly in a plane normal to the shaft axis. Support member 25 carries a pair of flyweights 28, each having a primary weight portion 29 spaced from the shaft axis and from the support surface and a base and finger portion 31 extending inwardly adjacent the axis and having a convexly curved side or surface 32 rockingly engaging the radial support surface 26 of the member 25. The surfaces 25, 32 establish an effective line of contact of each flyweight with the support member that moves toward or away from the axis in accordance with the corresponding rocking motion of the flyweight on the radial support surface.

In the preferred embodiment, the flyweights are restrained against radial motion other than the prescribed rocking motion by means of links 34 which pivotally connect points on the inner portions of the respective flyweight fingers with outwardly spaced points on the support member. Other arrangements for radial or lateral restraint of the flyweights are shown in the alternative embodiments of FIGS. 4-7 which will subsequently be described.

Referring back to the construction of FIGS. 1-3, the flyweights each include a finger 35 that extends along one side of the shaft 20 and engages a flange 37 of a bushing 38. The bushing is slidably movable in an axial direction on the shaft 20 and acts through a bearing 40 on a forked lever 41. The lever 41 is in turn fixed to a vertical torque shaft 43 oscillatingly carried in the housing and extending upwardly through the shaft duct 19 into the upper mechanism compartment 13 where it actuates a motion lever 44 affixed to the end thereof.

Lever 44 carries first and second laterally extending arms 46, 47, respectively, for connection with associated mechanisms. As seen in FIG. 3, the first arm 46 carries an adjusting screw 49 which engages a cup shaped cap 50 that is slidably received in one end of a cylindrical plunger 52. Within the cap 50 is an idle spring or low speed spring 53 which extends from the bottom of an internal recess into end engagement with an intermediate speed spring 55 carried within the plunger and engaging at its other end an adjusting screw 56. A flange 58 on the cap 50 is engagable with the end of the plunger 52 to limit compression of the intermediate speed spring.

Plunger 52 is reciprocably carried in a supporting boss 59 of the housing and a tension adjusting sleeve 61 that is threadably received in another wall of the housing. A flange 62 on the plunger engages the boss 59 and limits movement of the plunger in the direction of the first lever arm 46. A high speed or overspeed spring 64 extends between the flange 62 and the tension sleeve 61 to urge the plunger in the direction of the boss 59, tension on the spring being adjustable by adjustment of the tension sleeve 61.

The second laterally and upwardly extending arm 47 of the motion lever 44 carries a pin 65. The pin extends upwardly into engagement with the sides of a slot 67 provided in a cam plate 68 that is pivotally mounted on the housing by a fixed pin 70. Cam plate 68 further includes a cam slot or control slot 71 shaped in nonlinear configuration and engaged by a cam follower roller 73 mounted intermediate the ends of a cam follower lever 74. Lever 74 has one end secured to the housing by a pin 76, about which the lever pivots. At its other end, lever 74 carries a pivot pin 77 to which the central portion of a differential lever 79 is pivotally attached. Lever 79 includes a forked end 80 on one side of the pivot 77 and an oppositely extending end 82 in which a linkage pin 83 is mounted.

The forked end of the differential lever 79 engages an actuating pin 85 that is carried in a lever 86 secured to a cover mounted shaft 88 driven by an external manually actuated control lever 89. Travel of the lever 89 may be limited by suitable stops such as stop pin 91 mounted in the housing upper cover.

At its opposite end 82, the differential lever 79 is connected with injector rack actuating mechanism best shown in FIG. 2 and including a connecting link 92 that connects pin 83 with one end of a transfer lever 94. The lever 94 is pivoted at its center and connects at its other end with a first injector rack actuating rod 95 that extends outwardly of the housing for a connection with suitable linkage, not shown, of the engine injector rack control mechanism. A second rack actuating rod 97 is pivotally connected directly to the pin 83 at the end of the differential lever and extends out the other side of the housing for connection with the rack control mechanism for another bank of engine cylinders, not shown.

Low speed oscillation of the linkage is conventionally dampened by a combined spring and adjustable screw 98 carried in the housing.

A second manual control lever 100 is carried on a cover mounted shaft 101 which in turn carries a stop pin 103 that is engagable with the rack actuating linkage at the transfer lever 94 to hold the actuating linkage in a nonfuel supplying position of the injector racks when the lever 100 is moved to a predetermined position.

OPERATION

In operation, when mounted on an engine, the input shaft 20 in turned by the drive gear 22 at speeds proportional to those of the associated engine. This rotates the flyweight assembly and develops a centrifugal force that urges the flyweights outwardly, thus tending to oscillate the torque shaft 43 and motion lever 44 in a direction to compress the springs 53, 55 and 64 which bias the motion lever in the opposite direction.

As the engine speed is increased from stop to idle and subsequently to intermediate and maximum speeds, the increasing centrifugal force causes the flyweights to rock outwardly on the radial support surface, moving the bushing 38, torque shaft 43 and motion lever 44 to compress the various springs. The rocking action of the flyweights causes the point of contact of the flyweights base and finger portions 31 and the radial support surface 26 of the support member 25 to move outwardly from the axis of rotation as the weights rock outwardly. This action effectively increases the lever arm through which the centrifugal force acting on the flyweights is applied to the bushing 38 through the fingers 35 as the flyweights move outwardly. Thus, an increasing speed increases centrifugal force in a proportion approximating the square of the engine speed, the increase in the applying lever arm reduces the proportion of the increased centrifugal force that is applied to the springs through the motion lever and torque shaft.

By this construction, the increase in force on the springs with speed can be held to approximately a linear relationship, even though the centrifugal force acting outwardly on the flyweights themselves continues to increase in proportion to the square of the speed. The result is that a single set of flyweights can be used with a single group of appropriately selected springs to provide adequate control over the entire speed range required for operation of a conventional commercial vehicle diesel engine whereas with conventional flyweight mountings, it is normal to utilize at least two sets of flyweights, one controlling idle speeds and another for controlling maximum speeds.

The selection of the various springs in the biasing portion of the governor is appropriate to provide a predetermined position of the motion lever for each selected engine speed. For example, the idle speed spring 53 is provided with a spring force adequate to balance the force generated by the flyweights acting upon the motion lever when the engine is operating at the predetemined idle speed. Thus, at this point, spring 53 holds the flange 58 of the cap 50 away from a position of engagement of the end of the plunger 52 and further holds the cup-like edges of the spring cap 50 surrounding the idle speed spring away from engagement with the intermediate speed spring 55. Thus, the effective spring rate against which acts the force applied to the motion lever by the flyweights at idle speed is essentially that of the idle speed spring, modified slightly by the action of the intermediate speed spring which abuts the idle speed spring and with which it is in series.

As engine speed increases slightly above idle speed, the idle speed spring is compressed to a point where the cup-like edges of the spring cap 50 engage the end of the intermediate speed spring 55. At this point, further increases in speed cause compression of the intermediate speed spring by direct contact with the spring cap 50, without further compression of the idle speed spring. Thus, the effective spring rate against which the motion lever acts is increased to that of the intermediate speed spring at speeds above idle speed up to the point where the flange 58 of the spring cap seats against the end of the plunger 52. This ocuers when the engine has reached essentially its controlled maximum speed, whereupon further speed increases cause the spring cap to move the plunger 52, compressing the high speed spring 64 and applying its substantially higher spring rate against the force applied by the motion lever.

The result of the so far described operation is that the motion lever is moved to a series of specific predetermined positions dependent entirely upon the speed of the engine. This movement of the motion lever is transmitted through the pin 65 to the cam plate 68 and thence through the cam slot 71 and follower 73 to the follower lever 74. The result is the movement of the pivot pin 77 that positions the center of the differential lever 79 to a predetermined range of positions which are specifically determined by engine speed, as modified by the shape of the cam slot 71 and the selection of the various biasing springs in the biasing means.

The manual operating portion of the governor mechanism is conventional in that movement of the control lever 89 causes rotation of the differential lever about its pivot 77, causing the rack actuating linkage to be adjusted to either increase or decrease the amount of fuel supplied by the engine fuel injectors. This action of the manual control may, however, be modified by the previously described mechanical governing mechanism which acts to maintain minimum idle speed when the manual fuel control mechanism is not advanced and to prevent engine operation above the maximum control speed, even though the manual fuel control mechanism is fully advanced. At intermediate speeds, the force of the intermediate spring 55 in the spring pack and the shaping of the cam slot 71 in the cam plate are related to provide modulation of maximum fuel output as desired, so as to prevent overfueling of the engine, particularly at the lower operating speeds.

Thus, the preferred embodiment of the present invention provides a governor construction capable of control of maximum and idle engine speeds, with manual control of intermediate speeds modified by modulation of maximum fuel input over a predetermined portion of the intermediate speed range. Moreover, the mechanism accomplishes the desired purposes through use of a single set of novel rocking flyweights acting against a multiple spring biasing mechanism controlling the governing action over the full engine speed range. Additionally a novel cam plate and follower mechanism is utilized to provide overriding and modulating control of the fuel rack mechanism without the provision of direct acting movable stops in the actuating mechanism itself.

DESCRIPTION OF ALTERNATIVE EMBODIMENTS

In FIGS. 4-7, there are illustrated three alternative embodiments of flyweight mechanisms which function to accomplish essentially the same results as the mechanism of FIGS. 1-3, but are constructed with different forms of restraint devices for the flyweights. In the embodiment of FIGS. 4 and 5, a governor housing 111 rotatably journals an input shaft 120 carrying a flyweight mechanism including a support member 125 having a radial support surface 126 on which are rockingly retained a pair of flyweights 128.

The flyweights each include a primary weight portion 129 and a base and finger portion 131 having a convex side or surface 132 adapted to rock on the radial support surface 126 of the support member. A finger 135 on each flyweight engages a bushing 138 which acts on a bearing 140. The bearing in turn carries the flyweight force to a forked lever 141 that is attached to the governor torque shaft 143. These aspects of the construction are essentially the same as in the previously described embodiment.

The arrangement of FIGS. 4 and 5 differs in the means for radially restraining the flyweights to limit their motion to the prescribed rocking motion on the support member radial surface. This restraining means consists of a sheet metal strap member 145 which mounts on the radial support surface 126 of the support member and has an opening 148 through which the shaft 120 extends and by which the strap member is retained in position against the radial surface. Outwardly of the opening, the strap member includes two oppositely extending portions which are bent around the outer edges 151 of the flyweights and are secured to the outer surfaces thereof by means of rivets 154, although any other suitable form of attachment may be used.

With this construction, the rocking motion of the flyweights 128 on the support surface 126 is actually accomplished by the flyweight convex surfaces rolling on the strap member which in turn engages the support surface 126. The strap, being retained in place on the support surface at its center, lies along this surface at all points inside the movable line of contact of the flyweights with the support surface and remains in contact with the convex surface of the flyweight base at all points outside the line of contact of the flyweights with the support surface. In this way it is seen that the oppositely extending portions of the strap member flex as required during rocking motion of the flyweights and retain the flyweights from outward radial motion other than in the prescribed rocking fashion previously mentioned.

The embodiments of FIGS. 6 and 7, except for the flyweight restraining means, are essentially like the embodiments previously described. In FIG. 6, it will be noted that the support member radial support surface 226 is provided with rack like gear teeth 227 which are engaged by corresponding teeth 230 formed on the convex side 232 of the base and finger portion 231. In this embodiment, it should be apparent that rocking motion of the flyweights 228 is ensured by the engagement of the teeth 227 and 230 which provide the necessary radial restraint to prevent sliding of the flyweights on the radial support surface.

In FIG. 7, the radial support surface 326 is provided with centrally disposed raised cams 327 which are engaged by cam follower rollers 330 secured in recessed parts of the base and finger portions 331 adjacent the convex sides 332 thereof. In this embodiment, the cams 332 are shaped so that as the flyweights move outwardly, the roller followers 330 roll up the cams and require the flyweights to perform the prescribed rocking motion of their respective base and finger portions on the radial support surface 326.

It should be understood that the representation of various forms of flyweight mechanisms is not intended to limit the possible modifications which might be made in this feature without departing from the scope of the inventive concepts described. In like manner, the disclosure of a single preferred embodiment of other features of the invention is not intended to limit the possible alternative constructions which might provide equivalent results within the scope of the inventive concepts described. Thus, it is intended that the invention not be limited by the embodiments disclosed but that it have the full scope permitted by the language of the following claims.

I claim:

1. A rocking flyweight governor mechanism, said mechanism comprising a support member rotatable about an axis and having a radial support surface extending outwardly from and generally normal to said axis, at least one flyweight supported on said surface for rotation therewith, said flyweight having a primary weight portion spaced from said axis and said support surface and a finger portion extending inwardly adjacent said axis and having a convexly curved side rockingly engaging said radial support surface to establish an effective line of contact therewith which moves toward or away from said axis in accordance with corresponding rocking motion of the flyweight on the radial support surface, restraining means acting between radially relatively outward portions of said support member and relatively inward portions of said flyweight to restrain said flyweight against substantial radial sliding motion outward from said axis on said radial support surface and limit said flyweight to essentially rocking motion, axially movable abutment means adjacent said axis and opposing said finger portion inwardly of its contact line with said radial support surface and means biasing said abutment means and said finger into engagement adjacent said axis during limited axial movement of said abutment means and accompanying rocking motion of said flyweight, whereby, upon rotation of said flyweight mechanism at increasing speeds, centrifugal force on said flyweight primary weight portion increasingly tends to rock said flyweight outwardly, thereby urging said abutment means axially against the force of said biasing means, the effect on the abutment means of the exponential increase in centrifugal force with speed and outward rocking of the flyweight being in part offset by a coincidental increase in the lever arm distance from the contact line of the finger with the radial support surface to the engagement point of the finger with the movable abutment.

2. The combination of claim 1 wherein said restraining means comprises a link pivotally connecting a point on an inner portion of said flyweight finger with an outwardly spaced point on said support member.

3. The combination of claim 1 wherein said restraining means comprises interengaging teeth on the contacting portion of said finger curved side and said support member radial support surface.

4. The combination of claim 1 wherein said restraining means comprises a guide cam on one of said flyweight and support members and a cam follower on the other of said members and engaging said cam to limit said flyweight motion.

* * * * *